(12) United States Patent
Baker et al.

(10) Patent No.: US 8,645,543 B2
(45) Date of Patent: Feb. 4, 2014

(54) MANAGING AND RECONCILING INFORMATION TECHNOLOGY ASSETS IN A CONFIGURATION DATABASE

(75) Inventors: Ronald B. Baker, Wake Forest, NC (US); Russell C. Blaisdell, Cedar Park, TX (US); Paul M. Evans, Portland, OR (US); Ling-Ching W. Tai, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 12/903,436

(22) Filed: Oct. 13, 2010

(65) Prior Publication Data

US 2012/0096163 A1 Apr. 19, 2012

(51) Int. Cl.
*G06F 15/173* (2006.01)
(52) U.S. Cl.
USPC ........... 709/226; 709/224; 709/206; 709/220; 707/101; 707/102
(58) Field of Classification Search
USPC .......... 709/226, 224, 206, 220; 707/101–102, 707/1
See application file for complete search history.

(56) References Cited

U.S. PATENT DOCUMENTS

| | | | |
|---|---|---|---|
| 5,526,358 A | 6/1996 | Gregerson et al. | |
| 5,548,722 A | 8/1996 | Jalalian et al. | |
| 5,630,051 A | 5/1997 | Sun et al. | |
| 5,703,885 A | 12/1997 | Sun et al. | |
| 5,717,921 A | 2/1998 | Lomet et al. | |
| 5,878,431 A | 3/1999 | Potterveld et al. | |
| 6,004,027 A | 12/1999 | Sun et al. | |
| 6,223,200 B1 | 4/2001 | Barnes et al. | |
| 6,282,681 B1 | 8/2001 | Sun et al. | |
| 6,751,789 B1 | 6/2004 | Berry et al. | |
| 6,889,275 B2 | 5/2005 | Vandecappelle et al. | |
| 6,978,222 B2 | 12/2005 | Roser et al. | |
| 6,983,461 B2 | 1/2006 | Hutchison et al. | |
| 7,191,364 B2 | 3/2007 | Hudson et al. | |
| 7,200,862 B2 * | 4/2007 | Murching et al. | 726/3 |
| 7,222,119 B1 | 5/2007 | Ghemawat et al. | |
| 7,278,057 B2 | 10/2007 | Betancourt et al. | |
| 7,428,546 B2 | 9/2008 | Nori et al. | |

(Continued)

OTHER PUBLICATIONS

Office Action regarding U.S. Appl. No. 11/375,765, dated Mar. 29, 2010, 21 pages.

(Continued)

*Primary Examiner* — Wing F Chan
*Assistant Examiner* — Benjamin M Thieu
(74) *Attorney, Agent, or Firm* — Yee & Associates, P.C.

(57) ABSTRACT

A method and system for managing and reconciling naming conflicts in a configuration database. Attributes are collected about a detected resource in a network. Valid names for the detected resource are created based on the collected attributes and a set of naming rules. A valid name is created for each naming rule, and the naming rules have a priority order. A master-alias table is search to locate a match between existing names of known resources recorded in the master-alias table and any of the valid names. A partial match of resource attributes is determined to exist when all of the valid names in the set of valid names do not match an existing name in a matching entry. The detected resource is determined to be a new resource or an existing resource based on a priority of the naming rules used to create the valid names.

18 Claims, 11 Drawing Sheets

(56) References Cited

U.S. PATENT DOCUMENTS

| | | | |
|---|---|---|---|
| 7,577,722 | B1 | 8/2009 | Khandekar et al. |
| 2002/0087665 | A1 | 7/2002 | Marshall et al. |
| 2002/0143497 | A1 | 10/2002 | Roser et al. |
| 2003/0023656 | A1 | 1/2003 | Hutchison et al. |
| 2004/0024732 | A1* | 2/2004 | Klisch et al. ............... 707/1 |
| 2005/0028157 | A1 | 2/2005 | Betancourt et al. |
| 2005/0120273 | A1 | 6/2005 | Hudson et al. |
| 2005/0251804 | A1 | 11/2005 | Musta et al. |
| 2005/0278339 | A1 | 12/2005 | Petev et al. |
| 2006/0195560 | A1* | 8/2006 | Newport ............... 709/223 |
| 2007/0183421 | A1 | 8/2007 | Terrell et al. |
| 2007/0220513 | A1 | 9/2007 | Hwang |
| 2008/0021917 | A1* | 1/2008 | Baker et al. ............ 707/102 |
| 2008/0079724 | A1 | 4/2008 | Isard et al. |
| 2009/0063562 | A1* | 3/2009 | Dinger et al. ......... 707/104.1 |
| 2009/0228506 | A1* | 9/2009 | Wada et al. ............ 707/101 |
| 2011/0153787 | A1 | 6/2011 | Baker et al. |
| 2011/0173251 | A1 | 7/2011 | Sandhu et al. |

OTHER PUBLICATIONS

Final Office Action regarding U.S. Appl. No. 11/375,765, dated Sep. 14, 2010, 12 pages.

Appeal Brief regarding U.S. Appl. No. 11/375,765, dated Apr. 13, 2011, 14 pages.

Examiner's Answer regarding U.S. Appl. No. 11/375,765, dated Apr. 28, 2011, 14 pages.

Office Action regarding U.S. Appl. No. 12/645,941, dated Aug. 5, 2011, 18 pages.

Final Office Action regarding U.S. Appl. No. 12/645,941, dated Nov. 28, 2011, 12 pages.

Appeal Brief regarding U.S. Appl. No. 12/645,941, dated Apr. 27, 2012, 17 pages.

Examiner's Answer regarding U.S. Appl. No. 12/645,941, dated May 31, 2012, 11 pages.

Gal et al., "A Framework for Modeling and Evaluating Automatic Semantic Reconciliation", The VLDB Journal, 2005, vol. 14, pp. 50-67.

Lueh et al., "Fusion-Based Register Allocation", ACM Transactions on Programming Languages and Systems, vol. 22, No. 3, May 2000, pp. 431-470.

Ives et al., "The Orchestra Collaborative Data Sharing System", SIGMOD Record, Sep. 2008, vol. 37, No. 3, pp. 26-32.

Terveen et al., "Constructing, Organizing, and Visualizing Collections of Topically Related Web Resources", ACM Digital Library, vol. 6, No. 1, Mar. 1999, pp. 67-94.

Attie et al., "Synthesis of Concurrent Systems with Many Similar Processes", ACM Digital Library, vol. 20, No. 1, Jan. 1998, pp. 51-115.

Kun He et al., "A New Task Duplication Based Multitask Scheduling Method", Dialog/Inspec., Oct. 2006, pp. 21-23.

U.S. Appl. No. 12/645,941, filed Dec. 23, 2009, Baker.

\* cited by examiner

MANAGED ELEMENT CLASS ATTRIBUTE TABLE (ME TABLE)  302

| GUID | ACTUAL CLASS | NAME | LABEL | DESCRIPTION |
|---|---|---|---|---|
| 111 | COMPUTER SYSTEM | IBM 7755 C6367 YBWGSZ | SERVER1 | MAIN SERVER |
| 222 | OPERATING SYSTEM | IBM 7755 C6367 YBWGSZ/AIX5.1 | SERVER1'S AIX O/S | MAIN SERVER'S PRIMARY O/S |
| 333 | OPERATING SYSTEM | IBM 7755 C6367 YBWGSZ/Unix 1.0 | SERVER1'S Unix O/S | MAIN SERVER'S SECONDARY O/S |

OPERATING SYSTEM CLASS ATTRIBUTE TABLE (OSCAT)  304

| GUID | OS TYPE | OS VERSION | TOTAL MEMORY | TOTAL STORAGE | NAME |
|---|---|---|---|---|---|
| 222 | AIX | 5.1 | 1G | 20G | hostA |
| 333 | Unix | 1.0 | 2G | 20G | hostB |

COMPUTER SYSTEM CLASS ATTRIBUTE TABLE (CSCAT)  306

| GUID | DEDICATED ROLE | PROCESSOR FAMILY | MFG. | MODEL | MACH. TYPE | SERIAL NUMBER |
|---|---|---|---|---|---|---|
| 111 | SERVER | INTEL | IBM | 7755 | C6367 | YBWGSZ |

*FIG. 3*

MASTER-ALIAS TABLE 402

| MASTER GUID | MASTER NAME | ALIAS GUID | ALIAS NAME | CLASS TYPE | NAMING RULE | NAMING RULE PRIORITY |
|---|---|---|---|---|---|---|
| 100 | IP1 | 101 | MMS1 | COMPUTER SYSTEM | 110 | 1 |
| 100 | IP1 | 100 | IP1 | COMPUTER SYSTEM | 120 | 7 |
| 100 | IP1 | 102 | UUID1 | COMPUTER SYSTEM | 130 | 3 |
| 400 | IP1/AIX5.1 | 400 | IP1/AIX5.1 | OPERATING SYSTEM | 140 | 0 |
| 500 | IP1/AIX5.1/DB2 | 500 | IP1/AIX5.1/DB2 | SOFTWARE INSTALLATION | 150 | 0 |
| 600 | IP1/AIX5.1/WAS | 600 | IP1/AIX5.1/WAS | SOFTWARE INSTALLATION | 150 | 0 |
| 700 | IP1/AIX5.1/Lotus | 700 | IP1/AIX5.1/Lotus | SOFTWARE INSTALLATION | 150 | 0 |
| 800 | MMS2 | 801 | MMS2 | COMPUTER SYSTEM | 110 | 1 |
| 800 | MMS2 | 802 | UUID | COMPUTER SYSTEM | 130 | 3 |
| 300 | MMS2/WIN XP | 300 | MMS/WIN XP | OPERATING SYSTEM | 140 | 0 |
| 300 | MMS2/WIN XP | 301 | UUID/WIN XP | OPERATING SYSTEM | 140 | 0 |
| 555 | MMS2/WIN XP/VISIO | 555 | MMS2/WIN XP/VISIO | SOFTWARE INSTALLATION | 150 | 0 |
| 555 | UUID2/WIN XP/VISIO | 556 | UUID2/WIN XP/VISIO | SOFTWARE INSTALLATION | 150 | 0 |

FIG. 4A

| IP | MAC | MFG | MODEL | SERIAL | VMID | SUUID | FQDN | Reason or Use Case |
|----|-----|-----|-------|--------|------|-------|------|--------------------|
| M | M | | | M | | M | M | Normal Rescan of the same device |
| M | M | | M | M | | M | F | FQDN:Renamed;Hardware Repurposing;Hardware Relocation |
| | M | | M | M | | | F | *Other Combinations* |
| M | | | M | M | | M | F | |
| M | M | | M | M | | | F | |
| M | M | | M | M | | M | F | |
| M | M | | M | M | | M | F | |
| | M | | M | M | | M | F | |
| | M | | M | M | | M | F | |
| M | M | | M | M | | M | F | |
| M | M | | M | M | | M | F | |
| M | M | | M | M | | M | F | |

*FIG. 5A*

| | | | | | | |
|---|---|---|---|---|---|---|
| F | M | M | M | M | M | IP Address reassigned, physical relocation in the network, DHCP |
| M | F | M | M | M | F | System Board moved between hardware |
| M | M | M | M | M | M | LAN Adapter Card moved between hardware or replaced |
| M | M | M | F | M | M | BIOS Modified, Cards moved between hardware, Vendor Utility |
| M | M | M | M | M | M | Physical relocation to different site, with FQDN naming standards |
| F | M | M | M | M | F | |
| F | F | F | F | F | M | Hardware Refresh, Lease Replacement, or Potential Fail-Over |
| F | M | M | M | F | F | BIOS matches, but System Board/LAN Adapter Changed |

FIG. 5B

MANAGING AND RECONCILING INFORMATION TECHNOLOGY ASSETS IN A CONFIGURATION DATABASE

BACKGROUND

1. Field

The disclosure relates generally to an improved data processing system, and more specifically to managing and reconciling information technology assets in a configuration management database.

2. Description of the Related Art

Information Technology Infrastructure Library (ITIL) is a framework of best practice approaches intended to facilitate the delivery of high quality information technology (IT) services. In order to facilitate the integration and automation of ITIL best practices, ITIL specifies the use of CMDB (Configuration Management Database) to leverage a single source of information. A CMDB is a unified or federated repository of information related to all the components of an information system. The IBM Tivoli® CMDB, for example, is a fundamental software component that provides a specific level of data integration across Tivoli products. One of the primary goals for a CMDB is to provide support for configuration items (or resources) as defined by the ITIL. Chapter 7 of the ITIL Service and Support specification, which is herein incorporated by reference in its entirety, gives the details of this support.

Configuration management is a critical process responsible for identifying, controlling and tracking all versions of hardware, software, documentation, and other inanimate components of a configurable managed environment, such as an Information Technology organization. The goal of configuration management is to ensure that only authorized components, referred to as resources, are used in the configurable managed environment, and that all changes to resources are recorded and tracked throughout the life cycle of the component. The configuration management process includes performing tasks such as identifying configuration items and their relationships, and adding them to the CMDB. The CMDB may comprise all relevant details for each configuration item, such as relationships between resources, state or status, and historical information. Some examples of configuration items are computer system, application server, operating system, software installation, etc.

The CMDB nominally contains the latest information of the above type for all resources, such as the states and relationships thereof. In a configurable managed environment, as events occur that change the states or relationships of respective resources, the CMDB must be synchronized accordingly. That is, the CMDB must be updated, so that the data contained therein will reflect the changes. However, in a configurable managed environment of the above type, multiple resource management products are commonly used to identify resources in the IT enterprise. Each product may maintain its own separate data that is related to the set of resources it manages, and each product may comprise its own set of naming rules for naming or identifying a resource. As the products may comprise different naming rules, these products may also identify the same resource differently in many cases. As a result of the CMDB receiving resource identity data from various resource management products that identify the same resource differently, resource identity data is frequently duplicated in a CMDB, both logically and physically.

SUMMARY

According to one embodiment of the present invention, a computer implemented method, data processing system, and computer program product is provided for managing and reconciling information technology asset naming conflicts in a configuration database. With the illustrative embodiments, attributes are collected about a detected resource in a network of resources. A set of valid names for the detected resource is created based on the collected attributes and a set of naming rules. A valid name is created for each naming rule, and the naming rules in the set of naming rules have a priority order. The illustrative embodiments search a master-alias table to locate a match between existing names of known resources recorded in the master-alias table and any of the valid names. A partial match of resource attributes is determined to exist when all of the valid names in the set of valid names do not match an existing name in a matching entry. The detected resource is determined to be a new resource or an existing resource in the network based on a priority of the naming rules used to create the valid names.

BRIEF DESCRIPTION OF THE SEVERAL VIEWS OF THE DRAWINGS

FIG. 3 illustrates exemplary class attribute tables of information used by the CMDB to track resource attributes in accordance with the illustrative embodiments;

FIGS. 4A-4B illustrate exemplary tables of information used by the CMDB to reconcile conflicting names of resources in accordance with the illustrative embodiments;

FIGS. 5A-5C depict a matrix illustrating exemplary full and partial identifying attribute matches among resources in accordance with the illustrative embodiments;

DETAILED DESCRIPTION

Figure 1:
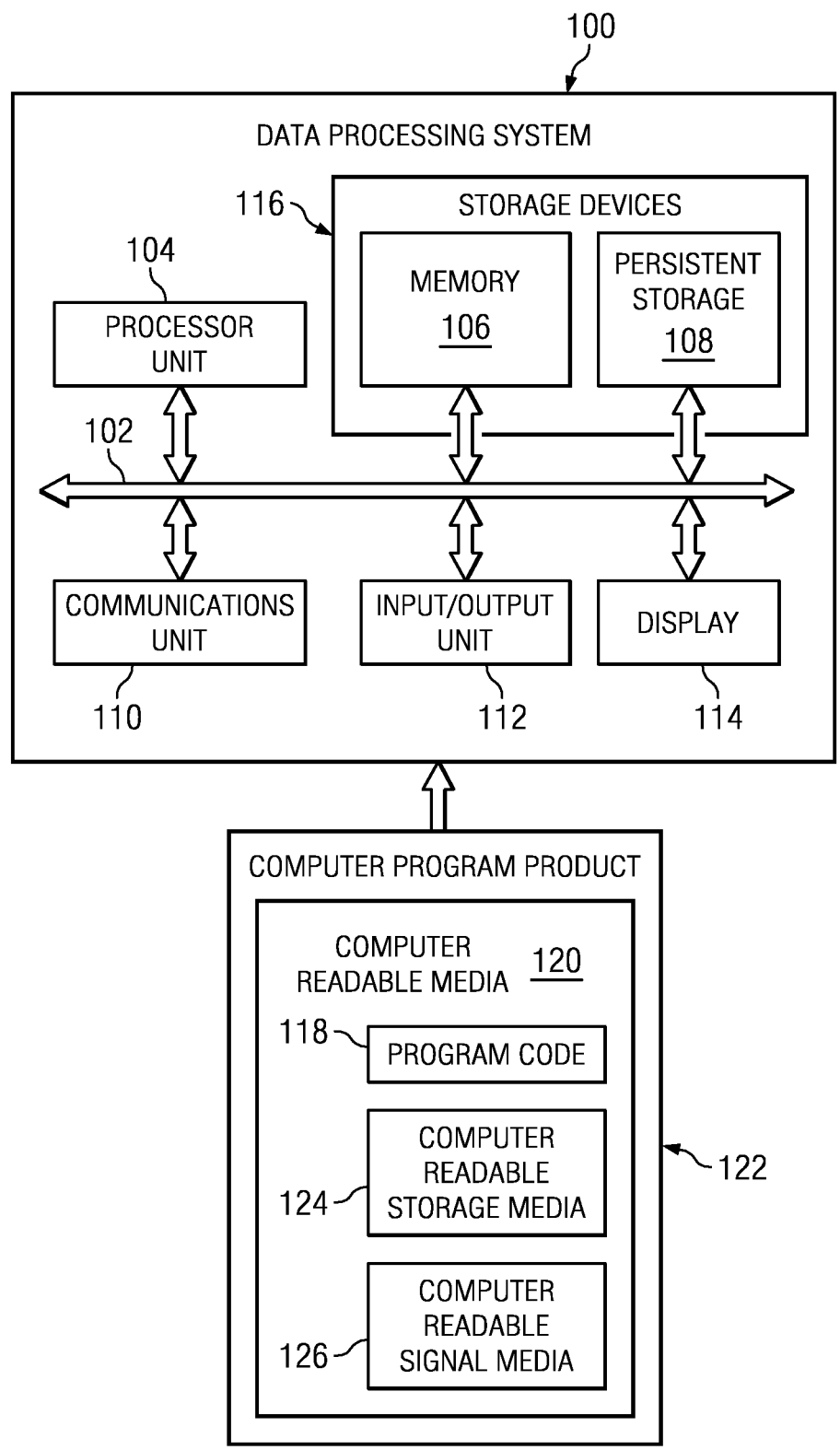
FIG. 1 is a block diagram of a data processing system in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustration of a data processing system is depicted in accordance with an advantageous embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a number of processors, a multi-processor core, or some other type of processor, depending on the particular implementation. A number, as used herein with reference to an item, means one or more items. Further, processor unit 104 may be implemented using a number of heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms, depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples, the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or computer readable storage media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be computer readable storage media 124 or computer readable signal media 126. Computer readable storage media 124 may include, for example, an optical or magnetic disk that is inserted or placed into a drive or other device that is part of persistent storage 108 for transfer onto a storage device, such as a hard drive, that is part of persistent storage 108. Computer readable storage media 124 also may take the form of a persistent storage, such as a hard drive, a thumb drive, or a flash memory, that is connected to data processing system 100. In some instances, computer readable storage media 124 may not be removable from data processing system 100. In these illustrative examples, computer readable storage media 124 is a non-transitory computer readable storage medium.

Alternatively, program code 118 may be transferred to data processing system 100 using computer readable signal media 126. Computer readable signal media 126 may be, for example, a propagated data signal containing program code 118. For example, computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 118 may be downloaded over a network to persistent storage 108 from another device or data processing system through computer readable signal media 126 for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different advantageous embodiments may be implemented in a data processing system including components in addition to or in place of those illustrated for data processing system 100. Other components shown in FIG. 1 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108, and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106, or a cache, such as found in an interface and memory controller hub that may be present in communications fabric 102.

Along with representing and storing relationships between resources, an important purpose of a CMDB is to provide a correlation mechanism between resources. Some resource management products have a limited view of resources and are unable to obtain all identity attributes of a resource. To accommodate these management products, the CMDB may support multiple naming rules for a number of resource classes. For example, two management products may discover a single computer system, and yet the different products refer to the computer system by different names. However, it is important to represent this single computer system as a single resource in the network. In order to foster consistent identification of resources in the CMDB, a CMDB Common Data Model (CDM) is used which formally defines the ways in which each type of resource (each class) is identified through the use of naming rules. A naming rule specifies the attributes or combination of attributes used to indicate characteristics or properties of the resource and that can be used to uniquely identify a resource. In addition, a resource may be identifiable using more than one naming rule. Each naming rule has an associated priority. The priority of a naming rule is based on the level of uniqueness the naming rule provides in identifying resources. For instance, the combination of Manufacturer, Model, and Serial Number (MMS) attributes is more unique when identifying a resource than an IP address or a MAC address, which may be often only temporarily assigned to a particular resource.

A valid name is a name that represents a resource and that is created using a naming rule, attributes collected about the resource, and in some cases, naming context information. As different naming rules may specify different attributes for naming a resource, a resource may be identifiable by multiple valid names. For example, there might be a naming rule employed by a resource management product that uses the IP address of a resource to identify the resource. In another example, a resource management product may combine the Manufacturer, Model, and Serial Number attributes (MMS) of a resource to identify the resource. Thus, a computer system may be identifiable by several naming rules, including signature, MMS, Primary MAC address, IP address, among others, and will therefore have multiple valid names from which the resource may be identified. If a resource has attributes that satisfy, for example, three naming rules, then three valid names will be created, wherein the valid name created based on the highest priority naming rule is the master name, and the other valid names are alias names of that master name. Using the example above, a valid name created from a high priority MMS naming rule will be designated as the master name for the resource, and the valid names of the resource created from the lower priority IP and MAC naming rules will be designated as aliases of the MMS master name.

In addition, for some types of resources, a simple combination of attributes may not be sufficient to uniquely identify a resource without some other naming context. For example, the drive letter (e.g., "C:") of a logical disk is not sufficient to give a unique identification. However, the drive letter is unique within the context of an operating system instance.

This means that the naming rule of a logical disk uses an operating system as the naming context, which may also be referred to as a "superior". Adding a superior/naming context to a naming rule addresses the unique identification problem. However, it also introduces an additional challenge in the name reconciliation process. That is, when the name of a superior is changed, this change must be propagated to all resources named after the superior, such that these named-after resources must be identified and their names changed to reflect the change to the name of their superior.

Supporting multiple naming rules allows different management products that scan the network and 'discover' the same resource to use different naming rules to identify the same resource. If identity information provided by the management products overlap (i.e., the naming rules used by the management products use at least some of the same resource attributes to identify the resource), the CMDB may facilitate the reconciliation of the multiple names of the same resource by determining whether or not the newly discovered resource is a new resource in the network, or whether the discovered resource is actually an existing resource with a different name identifier, or alias.

As in the above case in which the naming rules overlap, a discovered resource is determined by the CMDB to be a duplicate or alias of an existing resource in the network if a valid name of the resource matches a name of an existing resource. In other words, all of the attributes of the discovered resource that are used to create a valid name of the resource match the attributes of the existing resource that were previously used to create the name of the existing resource as recorded in a Master-Alias table in the CMDB. A discovered resource is a computing resource detected by a resource management program during a scan of a network of resources. An existing resource is a computing resource previously scanned by the CMDB and whose attribute information was collected and stored by the CMDB as a master or alias name in a Master-Alias table. In contrast, if none of the valid names of the discovered resource match a name of an existing resource recorded in the CMDB, the discovered resource is determined by the CMDB to be a new resource. A method for correlating resource names, fixing duplicate name instances, and creating new resources in a CMDB is disclosed in co-pending U.S. Patent Application Publication No. 2008/0021917, filed Jul. 24, 2006 and titled "Resource Name Reconciliation in a Configuration Database", which is hereby incorporated by reference in its entirety. However, when the naming rules overlap, there can be situations as a normal part of a resource life cycle in which only some of the identifying attributes of a discovered resource match the attributes of an existing resource. In other words, the CMDB may determine that there is a partial match of attributes (and thus valid names) between a discovered resource and existing resource. Attributes of a resource may change during the resource life cycle, such as an IP address and MAC address temporarily assigned to the resource, or even an MMS or fully qualified domain name (FQDN) of the resource that is changed by the customer.

The illustrative embodiments provide a solution to the problem of reconciling resource name instances when a partial match of resource attributes is detected between a discovered resource and an existing resource in the CMDB. A partial match between a discovered resource and an existing resource may indicate that the discovered resource is the same resource as the existing resource, or alternatively, a partial match may indicate that the discovered resource is a new resource. The CMDB bases its determination as to whether the partial match indicates the discovered resource is the same resource or a new resource based on the priority assigned to each naming rule used to obtain the attributes about the resources. Thus, the action taken by the CMDB to reconcile the names of the resources is dependent on the naming rule priorities used to create the names that match (and do not match) between the discovered resource and an existing resource. In the partial matching situations, if names created using high priority naming rules match, the CMDB determines that the discovered resource is the same resource as the existing resource, and the CMDB also updates the Master-Alias table with the new valid names of the existing resource created with the lower priority naming rules. If names created using the low priority naming rules match but names created using higher priority naming rules do not match, this indicates that the discovered resource is a new resource, and the CMDB will remove the matching lower priority names from the existing resource and reassign these names to the new resource. If a lower priority name being removed was a master name of the existing resource, the CMDB will select one of the remaining names with the highest priority as the new master of the existing resource. If the lower priority name being removed is a superior, the names of all resources that have used this name as its superior are reconstructed to reflect the superior name change. If the matching name is an alias name in the Master-Alias table, it will become an alias of the newly discovered resources and its master is the valid name created with the highest priority naming rule.

Figure 2:
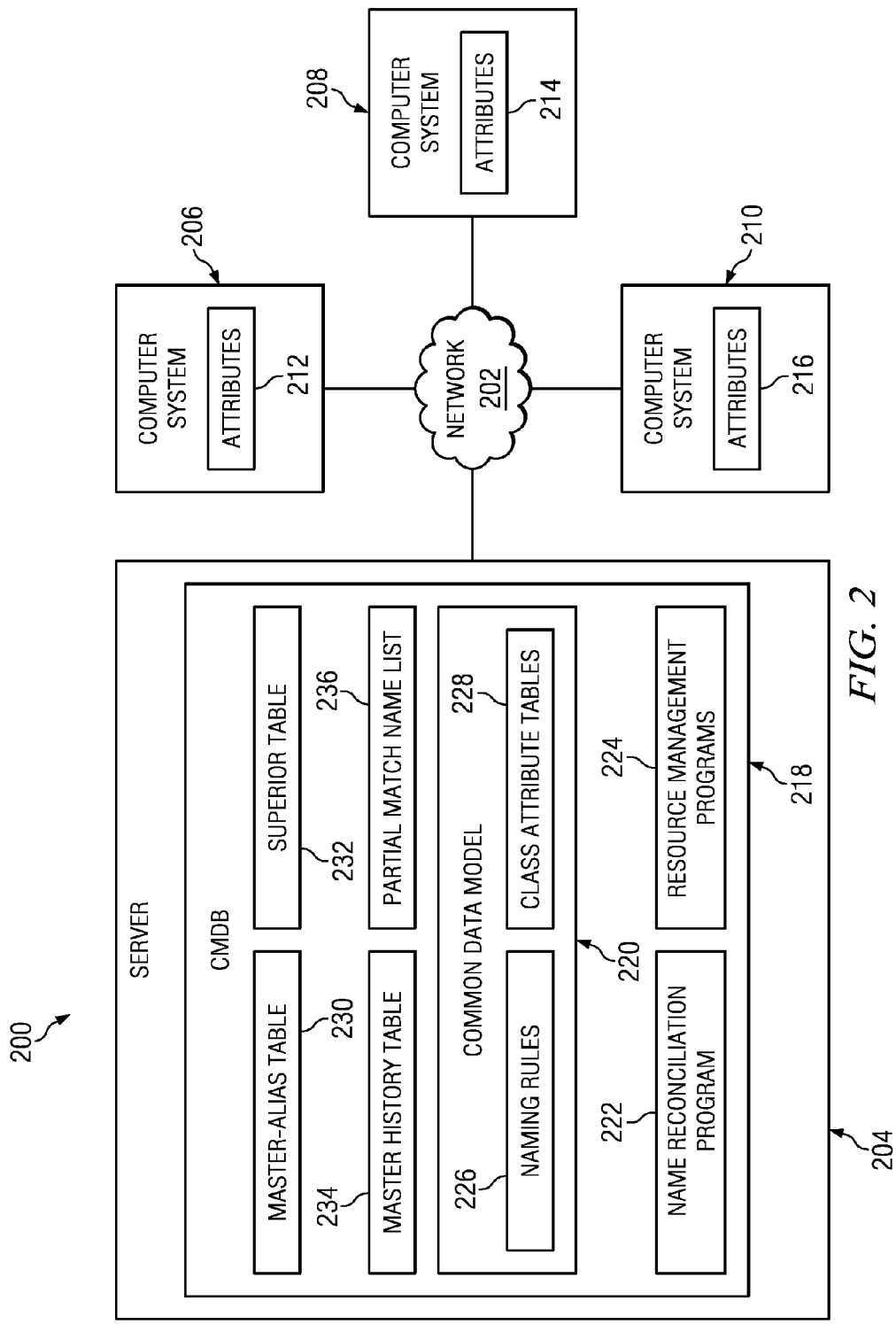
FIG. 2 is a distributed data processing system in which the illustrative embodiments may be implemented, the data processing system including a configuration management database (CMDB) for reconciling partial matches of attributes for resources managed by the CMDB.

FIG. 2 is a distributed data processing system in which the illustrative embodiments may be implemented, the data processing system including a configuration management database (CMDB) for reconciling partial matches of attributes for resources managed by the CMDB. Data processing system 200 comprises network 202, which is the medium used to provide communications links between various devices and computers connected together within network data processing system 200. Network 202 may include connections, such as wire, wireless communication links, or fiber optic cables. In one embodiment, data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, data processing system 200 also may be implemented as a number of different types of networks, such as for example, an intranet, a local area network (LAN), or a wide area network (WAN). It should be appreciated that FIG. 2 is only provided as an illustration of one implementation and is not intended to imply any limitation with regard to the environments in which different embodiments may be implemented. In other words, data processing system 200 may include more or fewer components as necessary to accomplish processes of the different illustrative embodiments.

In this illustrative example, data processing system 200 includes server 204 connected via network 202 to computer systems 206, 208, and 210. Server 204 is an example of data processing system 100 in FIG. 1. Server 204 comprises CMDB 218 which is a repository that manages information about all of the resources in data processing system 200, including computer systems 206, 208, and 210. Computer systems 206, 208, or 210 may comprise any hardware and/or software resource, such as a personal computer or network computer, an operating system, software installation, application server, DB2 system, etc. Each computer system may comprise attributes (e.g., 212, 214, 216) that may be used to uniquely identify the resource within the network. These identifying attributes of a resource may include, for example, Manufacturer, Model, Serial Number (MMS), System Board Universal Unique Identifier (UUID), Media Access Control (MAC) address, Internet Protocol (IP) address, Fully Qualified Domain Name (FQDN), Operating System (OS), among others.

In this illustrative example, CMDB 218 includes common data model (CDM) 220, Name Reconciliation Program 222 and Resource Management Program 224. CDM 220 is an information model based on the unified modeling language (UML) that provides consistent definitions for managed resources, business systems and processes, and other data, and the relationships between those elements. CDM 220 outlines the different naming rules 226 that may be used to identify a resource in the network. For instance, a naming rule may specify that a resource can be identified based on an individual attribute of the resource, such as a MAC address. In contrast, a naming rule may specify that a resource can be identified based on a combination of individual resource attributes (e.g., Manufacturer, Model, and Serial Number (MMS), MMS and MAC address, UUID and MAC address, etc.)

Name Reconciliation Program 222 allows resource management programs, such as Resource Management Program 224, to register a resource by providing the CDM class and the attributes the management program knows about a resource. A resource may have multiple names based on the naming rules. However, only one name is assigned to be the master name of a resource, and the remaining names for the resources are aliases. Name Reconciliation Program 222 maintains the mapping of the master and corresponding alias resource names, and links them together in Master-Alias table 230.

Resource Management Program 224 is an example of a management program which scans network 202 to identify computing resources in data processing system 200. Resource Management Program 224 employs a particular set of naming rules defined by common data model 220 which specify the attribute information the program collects about a resource. Although a single resource management program is illustrated in this example, it should be noted that server 204 may employ any number of management programs which utilize the same and/or different naming rules to identify resources in data processing system 200 in different ways. Resource Management Program 224 scans network 202 and provides the attributes for each resource detected in the system based on its own set of naming rules to CMDB 218.

CMDB 218 may comprise a plurality of management programs which may use different naming rules to identify resources in the data processing system. Based on the attributes of a discovered resource, CMDB 218 may create one or more valid names for a discovered resource. However, attributes about a resource (e.g., computer system 206) collected by one management product using a set of naming rules may overlap the attributes collected about computer system 206 by another management product using another set of naming rules. When the naming rules overlap, a partial match of attributes may result as some of the identifying attributes of a discovered resource may match an existing resource, while the other attributes of the discovered resource may not. For the partial match situations in which only a portion of the attributes of a discovered resource match the attributes of an existing resource recorded in CMDB 218, Name Reconciliation Program 222 reconciles the discovered and existing resource name instances using various data structures within CMDB 218 to resolve the potentially different identifying names of resources in the network.

In this illustrative example, these reconciliation data structures within CMDB 218 include Master-Alias table 230, Superior table 232, Master History table 234, and Partial Match Name List 236. Master-Alias table 230 is used by Name Reconciliation Program 222 to reconcile the name of the discovered resource in an exemplary manner described below in FIGS. 7A-7B in order to maximize concurrency levels between databases in CMDB 218. Master-Alias table 230 comprises entries that specify the names (master and aliases) of resources previously discovered by the resource management programs and their associated naming rules. Each entry in Master-Alias table 230 may comprise at least the following information: master GUID of the resource, master name of the resource, alias GUID of the resource, alias name of the resource, class type, naming rule used to identify the resource, and priority level of the naming rule. The master GUID and alias GUID (global unique identifiers) are identifiers generated from the collected resource attributes. When a resource is discovered by Resource Management Program 224, CMDB 218 first creates a universal resource identifier (URI) comprising a string of the set of resource attributes received from a management program for the discovered resource. The URI may be created by concatenating the resource attributes together. For instance, an example URI for a computer system name may be formatted as follows: Ibm-dm:///ComputerSystem/manufactuerer=IBM+model=T42+serialNumber=1234. The order of the attributes in the URI string is defined and determined by the naming rule. CMDB 218 may then generate a type 3 (name-based) GUID from the URI, which may be used for quick database lookups to locate a matching resource entry in Master-Alias table 230. Thus, searches of the Master-Alias table 230 to locate matching resource names may be performed using the GUID of a valid name, rather than having to search for name itself. A GUID comprises numbers generated by inputting the string of attributes (URI) of a resource into an algorithm to generate a unique number that identifies a particular resource. As multiple valid names may be created for a discovered resource, each valid URI name for a discovered resource may be hashed using MD5 hashing into a unique GUID.

For each of the valid names created for a discovered resource, Name Reconciliation Program 222 uses the generated GUIDs for the discovered resource to perform a look up of Master-Alias table 230 to locate any entries that have master or alias names that match any of the valid names. When a match between a new valid name and a existing name is found in the table, the matches between the discovered resource and the existing resource may represent a full or partial match, wherein a full match is where all attributes of the discovered resource match the attributes of the existing resource (i.e., where only one such match is found in Master-Alias table 230), and wherein a partial match is where only some of the attributes of the discovered resource match the attributes of the existing resource (i.e., where more than one such match is found in Master-Alias table 230). Examples of these full and partial matches are further illustrated in FIGS. 5A-5C.

If no match is found among any of the valid names created for the discovered resource and any of the names for existing resources recorded in Master-Alias table 230, Name Reconciliation Program 222 determines that the discovered resource is likely a new resource. In this situation, Name Reconciliation Program 222 creates a new resource entry for the resource in Master-Alias table 230. Name Reconciliation Program 222 selects the valid name from all the valid names created for the discovered resource with the highest priority to be the master name in the master name field in the new resource entry in Master-Alias table 230. All other valid names created for the resource with lower priorities are added as alias names of that master name in the new resource entry.

If a full match is found between the valid names created for the discovered resource and a name for an existing resource in Master-Alias table 230, Name Reconciliation Program 222 determines that the discovered resource and the existing resource are likely the same resource. A full match exists when only one match of a valid name of the discovered resource and a name of an existing resource is found. Name Reconciliation Program 222 determines whether the matching existing name in Master-Alias table 230 is a master name (the matching existing name is in the master name field) or an alias name (the matching existing name is in the alias name field). If the matching existing name is a master name, Name Reconciliation Program 222 adds all the other valid names created by CMDB 218 for the discovered resource to Master-Alias table 230 as an alias of that master name. However, if the matching existing name is an alias name, Name Reconciliation Program 222 adds all the valid names created by CMDB 218 to Master-Alias table 230 as alias of the master of that existing name.

If a partial match of names between the discovered resource and the existing resource is detected, Name Reconciliation Program 222 checks the priority of the naming rules for the valid names that form the partial match. A partial match exists when more than one match of a valid name of the discovered resource and a name of an existing resource is found. When the partial match comprises a match of valid names created with a higher priority naming rule and a name of an existing resource, Name Reconciliation Program 222 determines if the match of the valid names created with a higher priority naming rule involves only one master name in Master-Alias table 230. If so, Name Reconciliation Program 222 adds all valid names created by CMDB 218 in the alias name field of the master name.

In contrast, when the partial match comprises a match of valid names created with lower priority naming rules and a name of an existing resource rather than a match of names created with higher priority naming rules, Name Reconciliation Program 222 determines, for each of the matching low priority valid names, if the name of the matching existing resource name is a master name in Master-Alias table 230. If the matching existing resource name is a master name, Name Reconciliation Program 222 selects an alias name in that existing resource entry in Master-Alias table 230 created with the highest priority naming rule and updates the master name field in that existing resource entry with the alias name (now the new master). In addition, Name Reconciliation Program 222 may also add the former master name and the new master name to Partial Match Name List 236. The former and new master names are temporarily recorded in Partial Match Name List 236. At the end of reconciliation processing, Partial Match Name List 236 will be persisted in the Master History table 234. Resource Management Programs 224 may periodically query Master History table 234 to determine what master names have been changed as a result of reconciliation and synchronized with data stored in their own data stores.

Furthermore, if the matching existing resource name is a superior name, Name Reconciliation Program 222 also fixes the names of all the resources that have used this name as their superior. Name Reconciliation Program 222 may fix the names of the resources that have used this name as their superior by changing all database entries and relationships pointing to the entry to point to the new master name.

Master History table 234 comprises a list of "old" and "new" master names assigned to a resource. An entry for a resource in Master History table 234 is populated when the master name field in Master-Alias table 230 is changed for that resource. The old and new master names are persisted in Master History table 234 to allow applications to perform a re-identification of resources to ensure this data is synchronized with their own data stores.

Superior table 232 maintains the immediate naming context of each name instance. For instance, a software installation is named after an operating system which is named after a computer system. In this example, operating system is the immediate naming context of software installation. Computer system is immediate naming context of operating system. A name instance can have zero to N naming contexts. The naming contexts in Superior table 232 enables Name Reconciliation Program 222 to locate all the name instances affected by a naming context change. For example, if a CDM naming rule has defined the naming context of a software installation is a particular operating system, and the naming context of the operating system is a particular computer system, when Name Reconciliation Program 222 detects that two computer systems are the same computer system, one of the computer systems will be the master, and the other will become its alias. All the operating system and software installation instances named after the alias computer system must be changed to use the new master computer system. In other words, when attributes of an operating system may not be sufficient to uniquely identify an operating system and require a naming context, i.e. computer system, to further qualify the operating system, if the computer system name has changed, all operating systems using that computer system as a naming context (or "named after" that computer system) must also be changed. Name Reconciliation Program 222 uses the naming context information stored in this table to build a naming context tree of affected name instances and make sure all affected names are identified and changed.

FIG. 3 illustrates exemplary class attribute tables used by a CMDB to track resource attributes in accordance with the illustrative embodiments. These tables are representative of Class Attribute tables 228 in FIG. 2, and may include Managed Element Class Attribute table 302, Operating System Class Attribute table 304, and Computer System Class Attribute table 306, among others. These class attribute tables may be updated during the name reconciliation process when names created with low priority naming rules are removed from a resource that is being reconfigured.

All resource types for resources managed in the CMDB are defined within a hierarchy of classes. The top of this hierarchy is a class called "Managed Element." Managed Element classes for resources are described in Managed Element Class Attribute Table (MECAT) 302. Thus, every resource (hardware or software) that is managed by the CMDB is a type of Managed Element (class) and will have a common set of attributes. As shown in MECAT 302, these attributes include a GUID, a class type (name of the resource's class), an identifying name (which, as depicted, may be generated by concatenating various attribute descriptors for a resource), a label (a local pseudonym assigned by a CMDB manager or other local Information Technology (IT) manager), and a description (which is likewise set by a local CMDB or IT manager, and describes the resource's role in an enterprise's IT environment). Some types (or classes) of CMDB resources have additional attributes which vary by class. For example, beside a GUID, an Operating System (OS) may have additional attributes like an OS type, an OS version, a host name (of a computer system in which the OS is running), total memory (used by the OS), and total physically attached storage that is available to the OS. These attributes are shown in Operating System Class Attribute Table (OSCAT) 304.

A Computer System may have additional attributes besides a GUID, such as a dedicated role of the computer system, a processor family used by the computer system, the computer system's manufacturer, model, machine type, and serial number, etc., as depicted in a Computer System Class Attribute Table (CSCAT) 306. As shown, common attributes for resources may be stored in one table (MECAT 302) and resource-specific attributes are stored in separate tables (OSCAT 304 and CSCAT 306).

The primary keys (attribute names) of both OSCAT 304 and CSCAT 306 are foreign keys back into MECAT 302. For example, consider the OS resource having a GUID of "222". This OS is shown in MECAT 302 as having the name "IBM 775 C6367 YBWGSZ/AIX 5.1", indicating that it is running on Server1 ("IBM 775 C6367 YBWGSZ"), and is Version 5.1 of AIX ("AIX5.1"). Thus, the superior of this OS is "IBM 775 C6367 YBWGSZ". If "IBM 775 C6367 YBWGSZ" were to change, then the name of this OS would also need to be changed. Likewise, any software installed attribute, software module attribute, and/or software product attributes that describe respective installed software, software modules, and/or software programs would also have their names changed if their superior were to change.

Figure 4B:
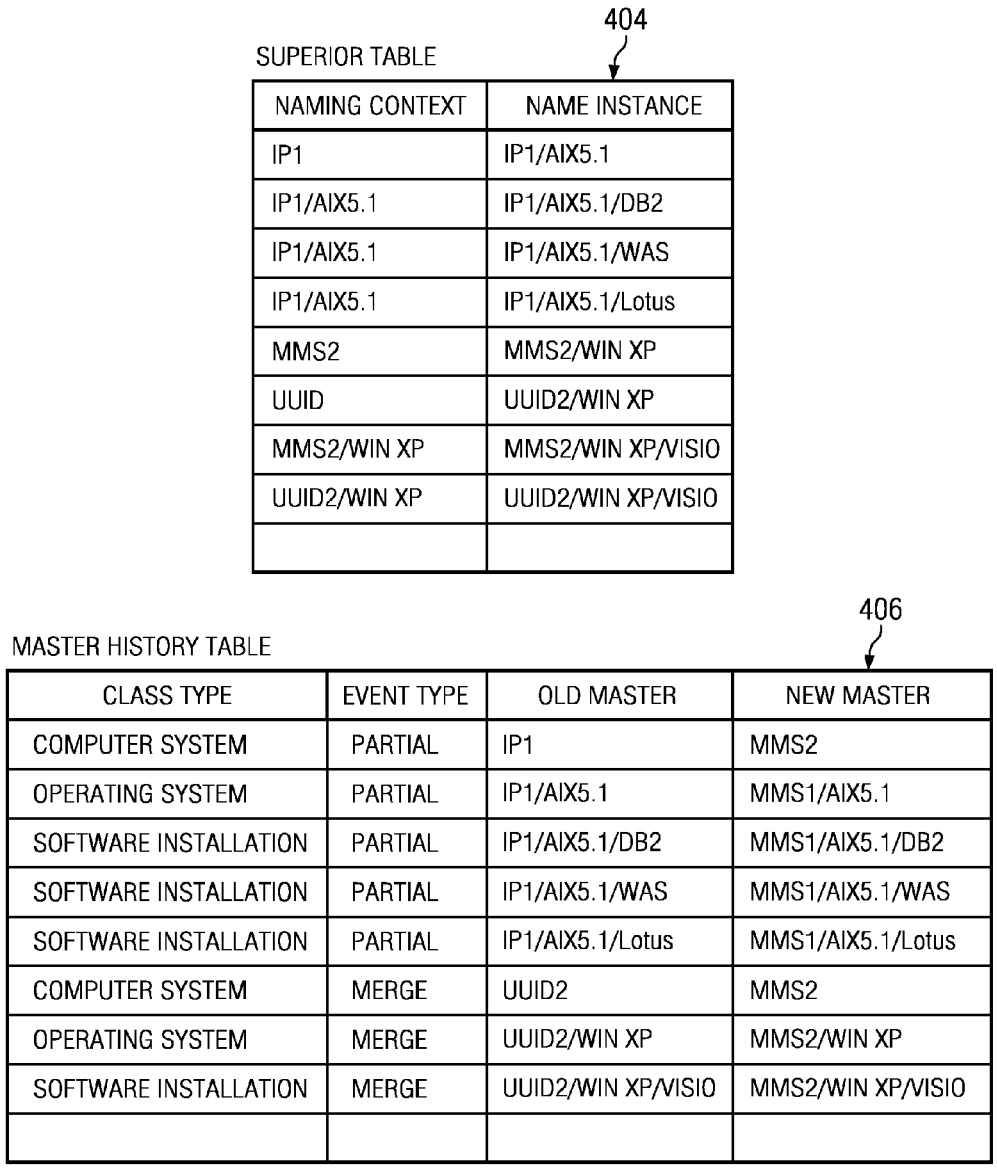

FIGS. 4A-4B illustrate exemplary tables of information used by the CMDB to reconcile names of resources in accordance with the illustrative embodiments. These tables include computer Master-Alias table 402, Superior table 404, and Master History table 406. While the naming conventions in CDM comprise a URI format, in these figures, a name is abbreviated as MMS to represent a name using the naming rule of manufacturer, model, and serial number, and UUID to represent a name using the naming rule of system board UUID. Further, the xxxx/yyyy/zzzz type format indicates the naming hierarchy. For example, MMS1/AIX5.1/DB2 indicates that DB2 has a naming context AIX5.1, which has a naming context MMS1.

Master-Alias table 402 is an example of Master-Alias table 230 in FIG. 2 and is used to maintain and correlate all name instances of a resource. As shown, Master-Alias table 402 comprises a list of master GUIDs, master names, alias GUIDs, alias names, class types, naming rules used to obtain the master or alias names, and the priority of each associated naming rule. For a master name instance in the table, the alias name and the master name are the same, i.e., an alias is its own master. In this example, the naming rule priorities range from 0 (highest priority) to 7 (lowest priority).

Superior table 404 is an example of Superior table 232 in FIG. 2. Superior table 404 comprises naming context information that is to build a naming context tree of name instances affected by changes to a master name instance. These affected name instances in the tree are also updated by the CMDB to reflect the changes made to the master name instance. For instance, if a naming rule requires a naming context, an operating system, for example, may require a computer system to be its naming context, such as ibm-cdm://ComputerSystem/macaddress=xyz,operatingSystem/OSName=WinXP. If the name of the computer system changes to signature=123, the operating system name must also be changed accordingly, such that the name may thus comprise the following naming context: ibm-cdm://ComputerSystem/signature=123,operatingSystem/OSName=WinXP.

Master History table 406 is an example of Master History table 234 in FIG. 2. As shown, Master History table 406 specifies the class of a resource and the "old" and "new" master names for the resource, as well as the event type (e.g., partial match processing or merge processing). An entry is added to Master History table 406 when the CMDB updates the master name field in the Master-Alias table for a resource with a new master name. The old and new master names are persisted in Master History table 234 to allow applications to perform a re-identification of resources to ensure this data is synchronized with their own data stores.

Figure 5C:
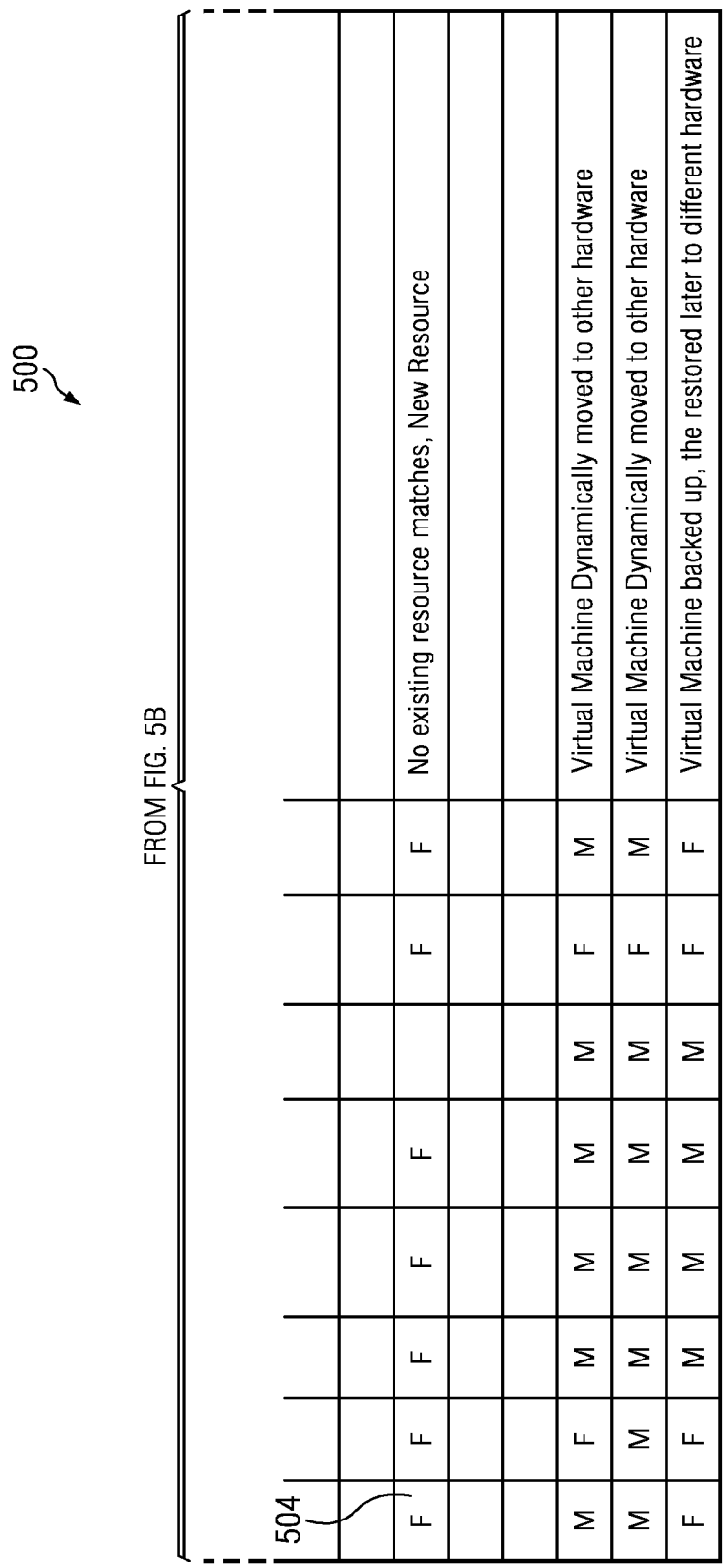

FIGS. 5A-5C provide an example illustration of a matrix 500 that shows exemplary full and partial matching scenarios among resources in the computer system class in accordance with the illustrative embodiments, as well as life cycle events of the resources. FIGS. 5A-5C are provided to illustrate and emphasize the importance of partial match processing in accordance with the illustrative embodiments.

In FIGS. 5A-5C, each identifying attribute for a typical computer system is listed across the top (e.g., IP Address, MAC Address, Manufacturer Name, Model, Serial Number, Virtual Machine ID, System Board Unique Universal ID (UUID), and Fully Qualified Domain Name (FQDN)). An attribute matching an attribute of the discovered resource is given an "M" value for "match" in the matrix, while an attribute that does not match is given an "F" value for "fail" in the matrix. Thus, if all attributes of an existing resource in the Master-Alias table match all of the attributes of the discovered resource, the Name Reconciliation Program concludes that the discovered resource is a duplicate or alias of the existing resource. This full match scenario is shown in entry 502. Thus, if all of the attributes of the discovered resource match the attributes of an existing resource, the action taken by the Name Reconciliation Program is to maintain the information in the entry for the existing resource in Master-Alias table, as the discovered resource is determined to be a duplicate or alias of the matching existing resource. In contrast, if none of the attributes of the discovered resource matches an attribute of an existing resource, the Name Reconciliation Program determines the discovered resource is a new resource. This no match scenario is shown in entry 504. The action taken by the Name Reconciliation Program in the case is to create a new entry in the Master-Alias table to represent the new resource and its attributes. The master name and the alias name in the Master-Alias table are the same.

Partial match scenarios are shown in the remaining entries in matrix 500. If a partial match occurs, in that only some of the attributes of the discovered resource match an attribute of an existing resource, the Name Reconciliation Program may determine that the resources are the same resource, or that the resources are different and a new resource should be created, with some of the identifying attributes moved to the newly created resource. The particular action taken by the CMDB to reconcile the partially matched resources depends on the priorities of the naming rule.

In addition to the columns comprising the identifying attributes of a resource, matrix 500 comprises a column 506 indicating the reason or use case that resulted in the match scenarios for each entry.

Figure 6A:
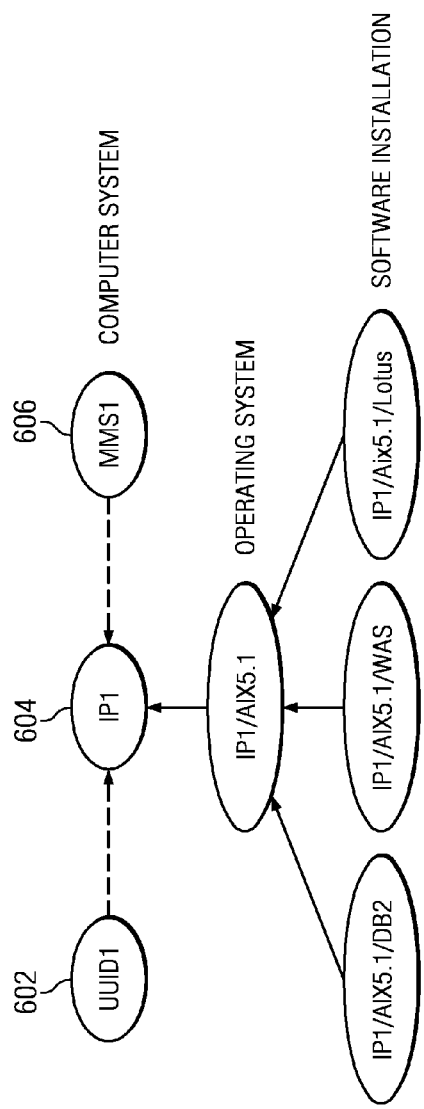
FIGS. 6A and 6B are diagrams illustrating a partial match scenario and naming context trees in accordance with the illustrative embodiments.
Figure 6B:
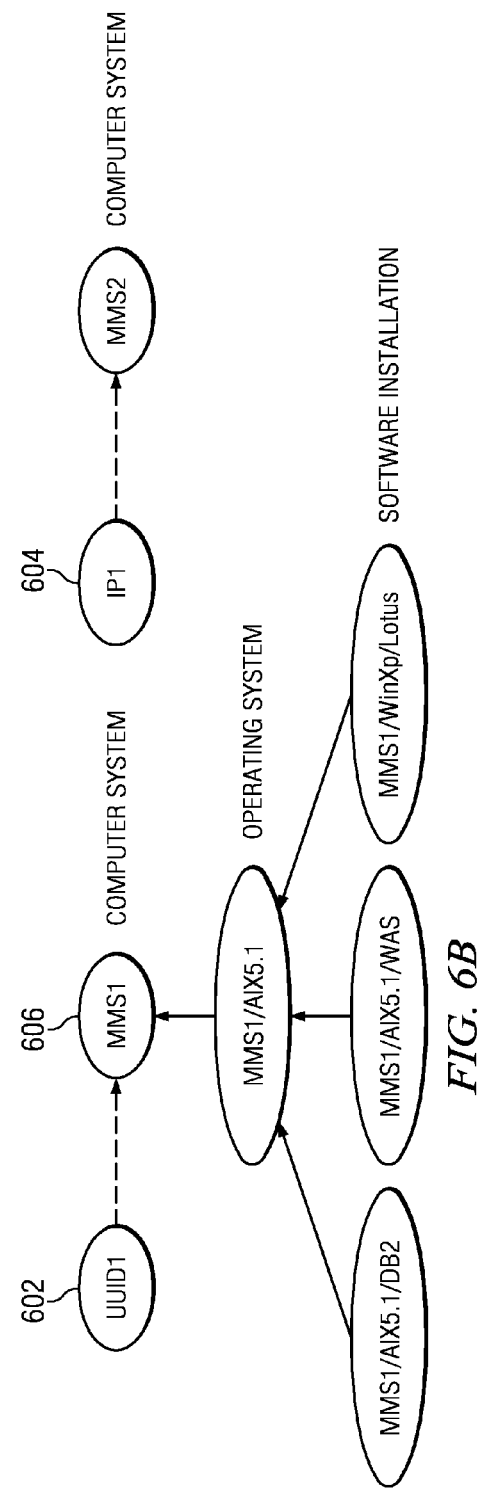

FIGS. 6A and 6B are diagrams illustrating a partial match scenario and naming context trees generated by the CMDB in accordance with the illustrative embodiments. The Naming Context Trees may be generated by the CMDB from the naming contexts defined in Superior table 404 in FIG. 4B. Consider the partial match scenario illustrated in FIGS. 6A and 6B in which one management program discovers and identifies a computer resource and its dependents using a naming rule of the system board UUID 602 and IP address 604, while another management program discovers and identifies the same computer resource and its dependents, but uses a naming rule of the MMS1 606 combination and IP address 604. The Naming Context Trees use the convention that in CDM, a name is in URI format. However, in these figures, a name is abbreviated as MMS to represent a name using the naming rule of manufacturer, model, and serial number, and UUID to represent a name using the naming rule of system board UUID. Further, a black solid line and xxxx/yyyy/zzzz type format indicates the naming hierarchy. For example, MMS1/AIX5.1/DB2 indicates that DB2 has a naming context AIX5.1, which has a naming context MMS1. In addition, the dotted line indicates a master and alias relationship. For example, UUID --->IP and MMS --->indicate that both UUID and MMS are aliases of the IP address master.

As shown by the naming tree in FIG. 6A, the IP address 604 of both computer resources are the same. The IP address 604 is currently the master of both the UUID 602 and MMS1 606 resources. Based on the priorities of the naming rules, the valid names of the resources created from the naming rules have different priority levels, and thus affect the actions taken by the CMDB to reconcile partial attribute matches between resources. In this particular example, the IP address comprises a valid name created from a lower priority naming rule and the MMS combination comprises a valid name created from a higher priority naming rule. Thus, the CMDB may determine that the two computer resources match in valid names created with a lower priority naming rule (i.e., IP address) but not in the valid name created with a higher priority naming rule (i.e., manufacturer/model/serial number).

FIG. 6B illustrates that the CMDB valid name created with a higher priority naming rule (MMS1) is selected as the master name in the Master-Alias table, and the UUID having a valid name created with a lower priority naming rules is added to the entry in the Master-Alias table as an alias name of the MMS1 master name. In addition, the IP address valid name, which was also created with a lower priority naming rule, is reassigned to a different resource (MMS2) as an alias name of MMS2 in another entry in the Master-Alias table.

Figure 7A:
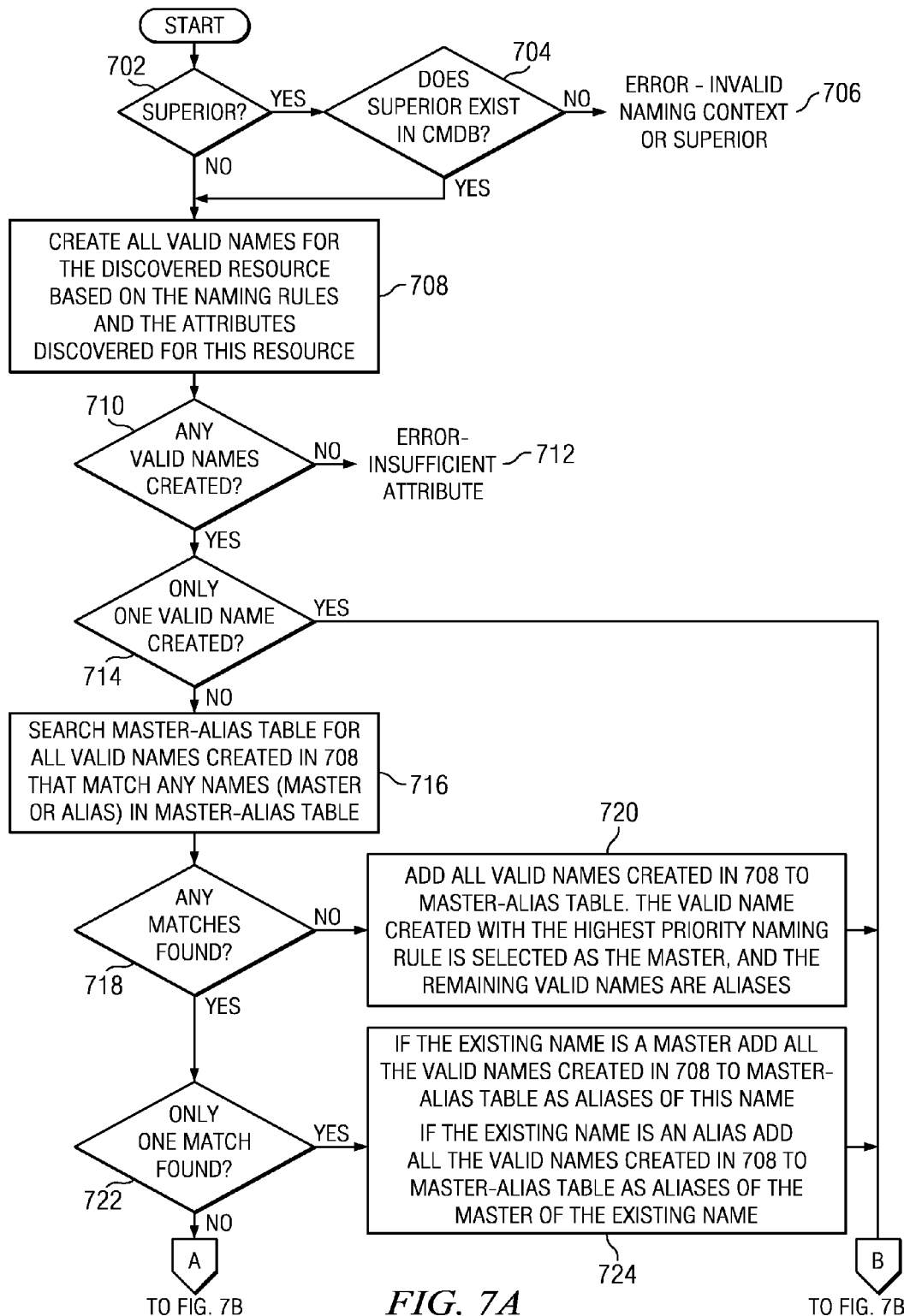
FIGS. 7A-7B illustrate a flowchart of a process illustrating steps used to reconcile resource identifiers when a partial match of names of a set of resources is detected by the CMDB in accordance with the illustrative embodiments.
Figure 7B:
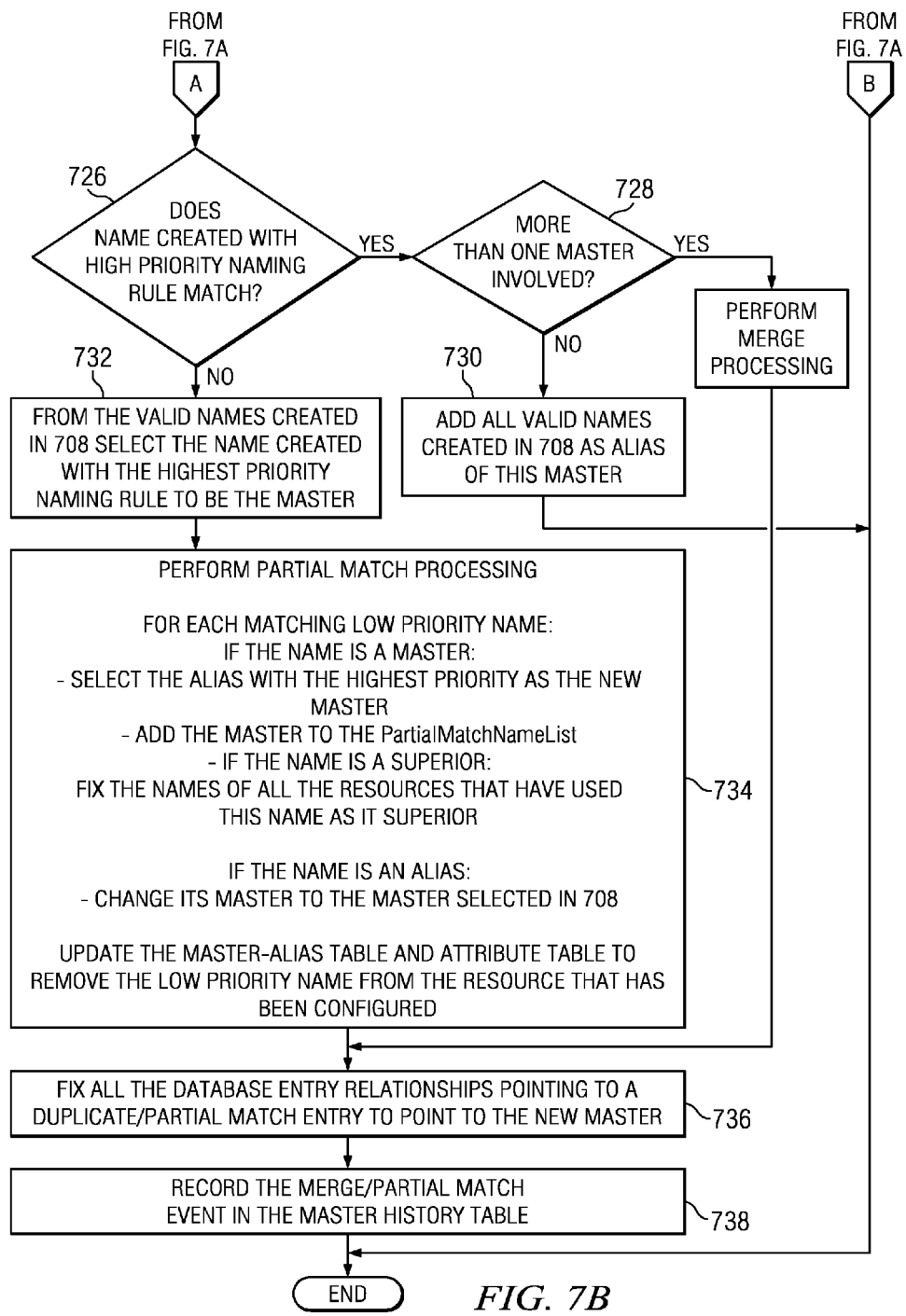

FIGS. 7A-7B illustrate a flowchart of a process illustrating steps used to reconcile resource identifiers when a partial match of names from a set of resources is discovered by the CMDB in accordance with the illustrative embodiments. The process described in FIGS. 7A-7B may be implemented by a configuration management database program, such as CMDB 218 in FIG. 2. The process describes reconciling IT naming conflicts when attributes collected about a detected resource in a network of resources are received. Generally, valid names may be created for the detected resource based on the collected attributes and a set of naming rules, wherein a valid name is created for each naming rule, and wherein the naming rules in the set of naming rules have a priority order. The master-alias table is searched to locate entries comprising at least one existing name of known resources recorded in the master-alias table that matches at least one valid name. A partial match may be determined to exist when all of the valid names created do not match an existing name in a matching entry. Based on the priority of the naming rules used to create the valid names, the process determines whether the detected resource is a new resource or an existing resource in the network.

The process begins as a query is made as to whether a discovered resource has a superior (step 702). As previously discussed, a superior is a higher level naming context, such as a computer system being a superior to an OS, an OS being a superior to an application, etc. The discovered resource may be either a hardware resource or a software resource of an enterprise. If a superior for the discovered resource exists ('yes' output of step 702), then the CMDB makes determination as to whether the specified superior exists in the CMDB (step 704). If the superior does not exist in the CMDB ('no' output of step 704), an error is generated (step 706), since there should have been a record that was created in the CMDB for the superior when the CMDB first recognized/managed that particular resource. However, if the superior does exist in the CMDB ('yes' output of step 704), the process continues to step 708.

Turning back to step 702, if a superior for the discovered resource does not exist ('no' output of step 702), the CMDB creates all of the possible valid names for the discovered resource using the naming rules and the attributes collected for the discovered resource (step 708). The CMDB may create all valid names for the resource by making a call to "makeNames( )" to generate all valid names for this particular resource. The method "makeNames" constructs all the valid names depending on attributes, context, and the naming rules of the resource to be created. For example, the method may construct a URI and use the MD5 hashing algorithm to hash the URI into a 16-byte global unique ID (i.e., GUID). Each naming rule uses a different set of attributes to derive a valid name. In creating a resource, at least one of the attribute sets used in deriving a name must be specified. If insufficient attribute data is provided, the CMDB reconciliation will reject the create request. Thus, the CMDB makes a determination as to whether at least one valid name for the discovered resource has been created (step 710). If more than one valid name is generated, the name created with the highest priority naming rule is the master name of the resource and the rest are alias names of the resource. If no valid names have been created ('no' output of step 710), an insufficient attribute error is generated (step 712). However, if at least one valid name has been generated ('yes' output of step 710), the CMDB determines if only one valid name for the resource has been created (step 714). If so ('yes' output of step 714), then the process is completed. Otherwise ('no' output of step 714), the CMDB searches all of the names (master names and alias names) in the Master-Alias table to locate any names that match any of the valid names created in step 708 (step 716). Thus, after obtaining all valid names of a resource from the "makeNames( )" routine, the CMDB name reconciliation process will then consult the Master-Alias table to determine whether there are other name instances of the newly discovered resource already existing in the CMDB in (step 718). If no matches between the valid names of the discovered resource and the existing names in the Master-Alias table are found ('no' output of step 718), the CMDB determines that the discovered resource is a new resource and adds all of the valid names to the Master-Alias table as a new entry in the table, wherein the valid name that was created with a naming rule that had the highest priority will be set as the master name for that resource, and the other valid names are set as alias names for that resource (step 720), with the process terminating thereafter. A rule is determined to have the highest priority if it has been selected as such, by a CMDB manager, either according to complying with pre-set naming rules or by the CMDB manager manually choosing a particular rule to have the highest priority for a particular situation or for a particular resource.

Turning back to step 718, if valid names were found in the Master-Alias table ('yes' output of step 718), the CMDB makes a determination as to whether only one match between the valid names of the discovered resource and any existing name in the Master-Alias table was found (step 722). If only one name match is found ('yes' output of step 722), then the CMDB determines the detected resource is an existing resource and the following steps, as described in step 724, are performed by the CMDB. In step 724, if the single valid name matches a master name in the Master-Alias table, then all the remaining (non-matching) valid name instances, returned by the "makeNames( )" method, are added to the Master-Alias table as being aliases of this master name. If the single valid name matches an alias name in the Master-Alias table, then the master name of this alias name is the master name of the resource, and all the remaining (non-matching) valid names are added to the Master-Alias table as aliases of this master name, with the process terminating thereafter.

Turning back to step 722, if more than one name match is found ('no' output of step 722), then the CMDB makes a determination as to whether any of the matching valid names were created with high priority naming rules (step 726). If a valid name was created with a high priority naming rule ('yes' output of step 726), the CMDB determines whether these valid names match more than one master name in the Master-Alias table (step 728). If only one master name is involved ('no' output of step 728), the CMDB determines the detected resource is an existing resource and adds all of the valid names created in step 708 as alias names of this master name (step 730). However, if more than master name is involved ('yes' output of step 728), the process performs a merge process to resolve naming conflicts by converging resource naming conflicts into a respective master name while also maintaining the alias names for the resources. The merge process is disclosed in co-pending U.S. patent application Ser. No. 12/645,941 titled "Information Technology Asset Information", filed on Dec. 23, 2009, which is hereby incorporated by reference in its entirety. The process then continues to step 736.

Turning back to step 726, if any of the matching valid names were not created with high priority naming rules ('no' output of step 726), the CMDB may determine that the detected resource is a new resource and remove matching lower priority names from an existing resource entry and reassign these names to the new resource in a new resource entry in the Master-Alias table. The CMDB calls the method "selectMaster( )" to select a new master from the valid names and to add all the remaining valid names as aliases names of this new master name (step 732). In addition, the following steps, as described in step 734, are then performed by the CMDB to process the partial matches of names in accordance with the illustrative embodiments. For each matching existing name that was created with a low priority naming rule, if the matching name is a master name in the Master-Alias table, the CMDB selects the alias name with the highest priority as the new master name. As an example, an existing resource has 3 valid names, IP1, MMS1 and UUID1, as shown in FIGS. 5A-5C, wherein IP1 is the master, and MMS1 and UUID1 are aliases. When IP1 is removed/reassigned to the newly discovered resource, the CMDB selects a new master for the existing resources from the remaining aliases (e.g., MMS1 and UUID1 in this example). Since MMS1 has higher priority than UUID, MMS1 will be selected as the new master of the existing resource.

As a result of this processing, some existing master name instances may now become aliases of the newly selected master. These obsolete master name instances will be added to the Partial Match Name List. In addition, if any of the names is a superior, a "fixNames( )" method is called to fix the names of all resources that have used this name as its superior. That is, the method "fixNames( )" finds all the resources that have used a given name instance as their superior, reconstructs new names of these resources using the new master, and makes old names aliases of the new names. If any of the resources whose name has been changed/fixed was a master, this name will be added to the Partial Match Name List. Furthermore, if the matching name is an alias name in the Master-Alias table, the CMDB changes the master of the entry to be the master name determined in step 732. The CMDB also updates the Master-Alias table and the Class Attribute tables to remove the low priority name from the resource that has been reconfigured, such as, for example, when a computer system is reconfigured to assign the IP address or FQDN of a computer system to a different computer system.

Once the partial match process has been performed, the CMDB may call the method "fixPartials( )" to fix all database entries, relationships, collection-memberships that are pointing to a partial entry to point to the new master (step 736). That is, the method "fixPartials( )" steps through the Partial Match Name List that has been built during the name reconciliation process and cleans up the CMDB database (including Master-Alias table) by replacing all references to obsolete masters to point to their new masters, and also delete obsolete partial master name instances from the CMDB. The CMDB then records the partial event in the master history table (step 738), with the process terminating thereafter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an " and "the " are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method executed by a computer for managing and reconciling information technology asset naming conflicts in a configuration management database, the method comprising:
   receiving attributes collected about a detected resource in a network of resources;
   creating a set of valid names for the detected resource based on the collected attributes and a set of naming rules, wherein a valid name is created for each naming rule, and wherein the naming rules in the set of naming rules have a priority order;
   searching a master-alias table to locate entries comprising at least one existing name of known resources recorded in the master-alias table that matches at least one valid name in the set of valid names;
   determining a partial match exists when all of the valid names in the set of valid names do not match an existing name in the master-alias table; and
   responsive to determining the partial match exists, determining, based on a priority of the naming rules used to create the valid names, whether the detected resource is a new resource or an existing resource in the network;
   wherein determining whether the detected resource is a new resource or an existing resource in the network based on a priority of the naming rules used to create the valid names further comprises:
      responsive to a determination that a plurality of matching existing names are located, determining that a matching valid name is created with a high priority naming rule; and
      responsive to a determination that the matching valid name matches only one master name in the master-alias table, determining the detected resource is an existing resource; and
      recording remaining matching valid names as alias names of the only one master name.

2. The method of claim 1, wherein determining whether the detected resource is a new resource or an existing resource in the network based on a priority of the naming rules used to create the valid names further comprises:
   responsive to a determination that a plurality of matching existing names are located, determining whether the matching valid names are not created with high priority naming rules;
   responsive to a determination that the matching valid names are not created with a high priority naming rule, determining the detected resource is a new resource; and
   removing the matching existing names from entries in the master-alias table and reassigning the existing names to a new entry for the detected resource in the master-alias table.

3. The method of claim 2, wherein removing the matching existing names from entries in the master-alias table and reassigning the existing names to a new entry for the detected resource in the master-alias table further comprises:
   responsive to a determination that a matching existing name being reassigned to a new entry is a master name in an existing entry, replacing the master name in the existing entry with an alias name, wherein the alias name is a new master name comprising a matching valid name created with the highest priority naming rule.

4. The method of claim 3, wherein removing the matching existing names from entries in the master-alias table and reassigning the existing names to a new entry for the detected resource in the master-alias table further comprises:
   recording the replaced master name and the new master name in a master history table, wherein the master history table comprises a partial match name list used to periodically synchronize name information in a data store of a resource management program to reflect new master names.

5. The method of claim 4, wherein removing the matching existing names from entries in the master-alias table and reassigning the existing names to a new entry for the detected resource in the master-alias table further comprises:
responsive to a determination that the matching valid name being reassigned to a new entry is a superior, updating names of all resources using the matching valid name as their superior to reflect a change to the superior.

6. The method of claim 5, wherein removing the matching existing names from entries in the master-alias table and reassigning the existing names to a new entry for the detected resource in the master-alias table further comprises:
responsive to a determination that the matching valid name being reassigned to a new entry matches an alias name in the master-alias table, recording the valid name created with the highest priority naming rule as a master name in the new entry; and
recording the matching valid name as an alias of the master name in the new entry.

7. The method of claim 1, further comprising:
responsive to the detected resource being reconfigured, updating the master-alias table and an appropriate class attribute table to remove a valid name of the detected resource created with a low priority naming rule from the master-alias table and class attribute table.

8. The method of claim 1, further comprising:
responsive to a determination that no matching valid name is found, creating a new entry in the master-alias table;
adding the set of valid names to the new entry;
recording a valid name in the set of valid names created with the highest priority naming rule as a master name of the detected resource in the master-alias table; and
recording remaining valid names in the set of valid names as alias names of the master name in the master-alias table.

9. The method of claim 1, further comprising:
responsive to a determination that a single matching valid name is found, determining whether the matching valid name matches a master name or an alias name in the master-alias table;
if the matching valid name matches a master name, recording the set of valid names as aliases to the matching master name in the master-alias table; and
if the matching valid name matches an alias name, recording the set of valid names as aliases of a master of the alias name in the master-alias table.

10. A data processing system for managing and reconciling information technology asset naming conflicts in a configuration management database, the data processing system comprising:
a bus;
a storage device connected to the bus, wherein the storage device contains computer usable code; and
a processing unit connected to the bus, wherein the processing unit executes the computer usable code to receive attributes collected about a detected resource in a network of resources; create a set of valid names for the detected resource based on the collected attributes and a set of naming rules, wherein a valid name is created for each naming rule, and wherein the naming rules in the set of naming rules have a priority order; search a master-alias table to locate entries comprising at least one existing name of known resources recorded in the master-alias table that matches at least one valid name in the set of valid names; determine a partial match exists when all of the valid names in the set of valid names do not match an existing name in the master-alias table; and determine, responsive to determining the partial match exists and based on a priority of the naming rules used to create the valid names, whether the detected resource is a new resource or an existing resource in the network;
wherein determining whether the detected resource is a new resource or an existing resource in the network based on a priority of the naming rules used to create the valid names further comprises:
responsive to a determination that a plurality of matching existing names are located, determining that a matching valid name is created with a high priority naming rule; and
responsive to a determination that the matching valid name matches only one master name in the master-alias table, determining the detected resource is an existing resource; and
recording remaining matching valid names as alias names of the only one master name.

11. A computer program product for managing and reconciling information technology asset naming conflicts in a configuration management database, the computer program product comprising:
a computer readable storage device having computer readable program code stored thereon, the computer readable program code for execution by a computer, comprising:
computer readable program code for receiving attributes collected about a detected resource in a network of resources;
computer readable program code for creating a set of valid names for the detected resource based on the collected attributes and a set of naming rules, wherein a valid name is created for each naming rule, and wherein the naming rules in the set of naming rules have a priority order;
computer readable program code for searching a master-alias table to locate entries comprising at least one existing name of known resources recorded in the master-alias table that matches at least one valid name in the set of valid names;
computer readable program code for determining a partial match exists when all of the valid names in the set of valid names do not match an existing name in the master-alias table; and
computer readable program code for determining, responsive to determining the partial match exists and based on a priority of the naming rules used to create the valid names, whether the detected resource is a new resource or an existing resource in the network;
wherein the computer readable program code for determining whether the detected resource is a new resource or an existing resource in the network based on a priority of the naming rules used to create the valid names further comprises:
computer readable program code for, responsive to a determination that a plurality of matching existing names are located, determining that a matching valid name is created with a high priority naming rule; and
computer readable program code for, responsive to a determination that the matching valid name matches only one master name in the master-alias table, determining the detected resource is an existing resource; and
computer readable program code for recording remaining matching valid names as alias names of the only one master name.

12. The computer program product of claim 11, wherein the computer readable program code for determining whether the detected resource is a new resource or an existing resource in the network based on a priority of the naming rules used to create the valid names further comprises:

computer readable program code for, responsive to a determination that a plurality of matching existing names are located, determining whether the matching valid names are not created with high priority naming rules;

computer readable program code for, responsive to a determination that the matching valid names are not created with a high priority naming rule, determining the detected resource is a new resource; and computer readable program code for removing the matching existing names from entries in the master-alias table and reassigning the existing names to a new entry for the detected resource in the master-alias table.

13. The computer program product of claim 12, wherein the computer readable program code for removing the matching existing names from entries in the master-alias table and reassigning the existing names to a new entry for the detected resource in the master-alias table further comprises:

computer readable program code for, responsive to a determination that a matching existing name being reassigned to a new entry is a master name in an existing entry, replacing the master name in the existing entry with an alias name, wherein the alias name is a new master name comprising a matching valid name created with the highest priority naming rule;

computer readable program code for recording the replaced master name and the new master name in a master history table, wherein the master history table comprises a partial match name list used to periodically synchronize name information in a data store of a resource management program to reflect new master names;

computer readable program code for, responsive to a determination that the matching valid name being reassigned to a new entry is a superior, updating names of all resources using the matching valid name as their superior to reflect a change to the superior; and computer readable program code for, responsive to a determination that the matching valid name being reassigned to a new entry matches an alias name in the master-alias table, recording the valid name created with the highest priority naming rule as a master name in the new entry and recording the matching valid name as an alias of the master name in the new entry.

14. The computer program product of claim 11, further comprising:

computer readable program code for, responsive to the detected resource being reconfigured, updating the master-alias table and an appropriate class attribute table to remove a valid name of the detected resource created with a low priority naming rule from the master-alias table and class attribute table.

15. The computer program product of claim 11, further comprising:

computer readable program code for, responsive to a determination that no matching valid name is found, creating a new entry in the master-alias table;

computer readable program code for adding the set of valid names to the new entry;

computer readable program code for recording a valid name in the set of valid names created with the highest priority naming rule as a master name of the detected resource in the master-alias table; and computer readable program code for recording remaining valid names in the set of valid names as alias names of the master name in the master-alias table.

16. The computer program product of claim 15, further comprising:

computer readable program code for, responsive to a determination that a single matching valid name is found, determining whether the matching valid name matches a master name or an alias name in the master-alias table;

if the matching valid name matches a master name, computer readable program code for recording the set of valid names as aliases to the matching master name in the master-alias table; and if the matching valid name matches an alias name, computer readable program code for recording the set of valid names as aliases of a master of the alias name in the master-alias table.

17. The computer program product of claim 11, wherein the computer usable program code is stored in a computer readable storage medium in a data processing system, and wherein the computer usable program code is downloaded over a network from a remote data processing system.

18. The computer program product of claim 11, wherein the computer usable program code is stored in a computer readable storage medium in a server data processing system, and wherein the computer usable program code is downloaded over a network from a remote data processing system for use in a computer readable storage medium with the remote system.

* * * * *